United States Patent [19]

McEvoy

[11] Patent Number: 4,726,086
[45] Date of Patent: Feb. 23, 1988

[54] COMPOSITE FOAM SEAT CUSHION AND METHOD OF PREPARATION

[75] Inventor: James T. McEvoy, Milwaukee, Wis.

[73] Assignee: Milsco Manufacturing Company, Milwaukee, Wis.

[21] Appl. No.: 895,358

[22] Filed: Aug. 11, 1986

Related U.S. Application Data

[62] Division of Ser. No. 629,092, Jul. 9, 1984, abandoned.

[51] Int. Cl.$^4$ .................... A47C 27/15; B29C 67/22; B29C 39/12
[52] U.S. Cl. ......................................... 5/464; 5/481; 249/166; 249/170; 264/45.1; 264/46.4; 297/DIG. 1; 425/817 R
[58] Field of Search .............. 264/45.1, 46.4; 297/455, DIG. 1; 425/817 R; 249/166, 170; 5/464, 481

[56] References Cited

U.S. PATENT DOCUMENTS

| | | | |
|---|---|---|---|
| 3,020,587 | 2/1962 | Alderfer et al. | 264/45.1 |
| 3,257,149 | 6/1966 | Frucate et al. | 264/45.1 X |
| 3,320,339 | 5/1967 | Smith | 264/45.1 |
| 3,393,258 | 7/1968 | Fultz et al. | 264/45.1 X |
| 3,393,259 | 7/1968 | Trogdon | 264/45.1 |
| 3,423,490 | 1/1969 | Trogdon et al. | 264/45.1 |
| 3,612,607 | 10/1971 | Lohr | 297/445 |
| 4,190,697 | 2/1980 | Ahrens | 264/46.4 X |
| 4,405,681 | 9/1983 | McEvoy | 264/46.4 X |
| 4,522,447 | 6/1985 | Snyder et al. | 297/452 |
| 4,670,925 | 6/1987 | Carussi | 5/464 X |

Primary Examiner—Philip Anderson
Attorney, Agent, or Firm—James E. Nilles

[57] ABSTRACT

A composite foam seat cushion is comprised of foams of different firmnesses which are bonded to adjacent foams without adhesives or glues. The cushion has a supportive bottom of one or more firm foams, a layer of soft foam on the top of and supported by the bottom layer, a protective front foam cap for the front edge of the layer of soft foam, a protective back foam cap for the back edge of the layer of soft foam and side walls of foam(s) of suitable firmness to provide support. A method of preparing the composite foam seat cushion is disclosed.

12 Claims, 12 Drawing Figures

COMPOSITE FOAM SEAT CUSHION AND METHOD OF PREPARATION

This is a division of application Ser. No. 629,092, filed July 9, 1984, now abandoned.

The present invention relates to a novel seat cushion and to a method of preparing the cushion.

BACKGROUND OF THE INVENTION

In the past, various methods have been used to make foam seat cushions which provide both support as well as a soft, comfortable seat. The methods of preparing such cushions for the most part have involved the bonding together with adhesives of different types of foams and/or foams of different hardnesses to form a laminated cushion having the desired properties. Such methods are effective, but they are time consuming and relatively expensive.

In the Ahrens U.S. Pat. No. 4,190,697, a method is disclosed for producing a multidensity foam article suitable for use as a seat cushion without using adhesives. In the patented method, a foam cushion having a firm, high density foam bottom layer and a soft, low density foam top layer is prepared by placing a first formulation capable of yielding a firm foam into a mold, permitting said formulation to start rising and foaming, pouring a second liquid formulation capable of forming a soft foam through the rising first formulation so that the first formulation floats upon the second formulation, and then permitting the two formulations to foam, rise and cure into a multidensity foam article in which the foam layers of different density are bonded and knitted together at their common boundaries.

In the McEvoy U.S. Pat. No. 4,405,681, a method is disclosed for producing a foam cushion comprised of three different firmnesses without using adhesives. The resulting cushion has a firm foam base, a soft foam top or seat and a border of foam of an intermediate firmness.

It is generally recognized that the ideal foam seat cushion would be a composite formed of multiple foams of different firmness and properties to best suit the anatomy of the expected user. The Ahrens and McEvoy methods and products are improvements over the prior art but a need still exists for a simple, fast, inexpensive method of preparing composite cushions having multiple areas of different firmness without piecing and glueing together pieces of foam.

SUMMARY OF THE INVENTION

It is an object of the present invention to disclose a simple, fast, inexpensive method of preparing a composite foam seat cushion having foams of different firmnesses bonded together without adhesives.

It is a further object to disclose a novel composite foam seat cushion comprised of foams of different firmnesses in which the foams are bound together without using adhesives.

The composite foam cushion of the present invention has a bottom formed of one or more firm, supportive foams, a layer formed of one or more soft cushioning foams on top of the bottom layer, a front cap of firmer foam(s) encompassing and protecting the front edge of the soft foam layer, a back cap of still firmer more supportive foam(s) encompassing and protecting the back edge of the soft foam layer and supportive side walls which are formed of one or more foams of different firmness than the soft foam layer. Each of the individual foams which form the composite foam cushion is bonded or knitted to the adjacent foams without the use of adhesives.

The method of the present invention of preparing the composite foam seat cushion comprises placing in the center of a suitable mold one or more relatively slow reacting formulations which produce firm supportive foams, placing in the front of the mold a formulation which will produce a foam of suitable properties for the front cap, placing in the back of the mold a formulation which will produce a foam of suitable properties for the back cap, and placing on the sides in the mold a formulation that will produce a foam of suitable properties for the sides of the cushion. The formulations in the mold are allowed to foam and start to rise until the formulations which will produce the front and back caps have started to gel and solidify but the foam still lacks structural integrity except where it is in contact with the heated mold and has solidified. Then one or more faster reacting formulations which produce a soft foam suitable for the cushioning layer are poured through the formulations in the mold. When the final formulations are added they are liquid and of higher specific gravity than the already foaming formulations, therefore the portions of the foaming formulations which have not yet completely gelled or set will be displaced and will float upon the final soft formulations. The mold is then closed and the formulations are allowed to cream, foam and rise to fill the mold. When sufficiently formed, the composite foam seat cushion is removed from the mold and further cured. It is inverted 180° for use as a cushion.

The length of time that the first formulations are allowed to cream, rise and, if desired, gel will depend on the reaction rates of the foams being utilized, primarily the reaction rate of the first foam formulations. If the mass of the first formulations has increased too far in the foaming reaction, the viscosity of the mass will be such that the final formulations(s) being added will not be able to penetrate. On the other hand, if the foaming reaction of the first and intermediate formulations has not advanced sufficiently, the formulations will commingle and the resulting article will not exhibit the desired stratified layers of foams of different firmness.

The above mentioned and other objects will be apparent to those skilled in the art from the description of the preferred embodiment and the drawings.

DESCRIPTION OF THE PREFERRED EMBODIMENT

In FIGS. 1 to 4 of the drawings is seen one embodiment of a composite foam cushion 10 of the present invention which is suitable for use as a vehicle seat cushion.

Figure 1:
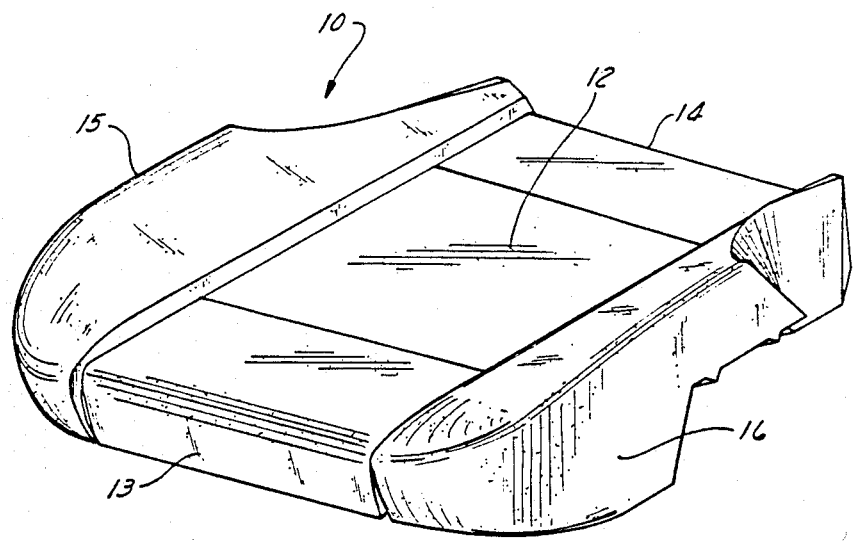
FIG. 1 is the perspective view of the preferred embodiment of the composite foam seat cushion of the present invention.
Figure 2:
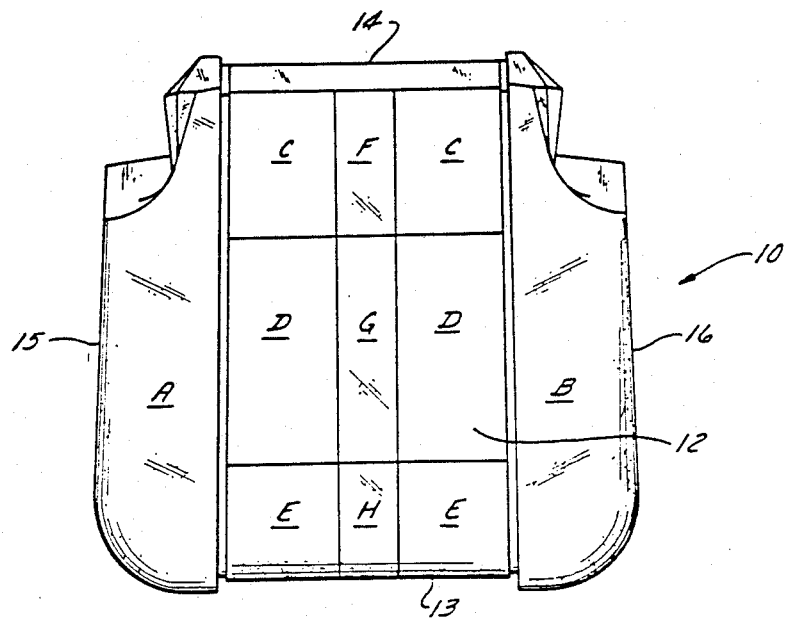
FIG. 2 is a top view of the cushion of FIG. 1 with various sections labeled with letters.
Figure 3:
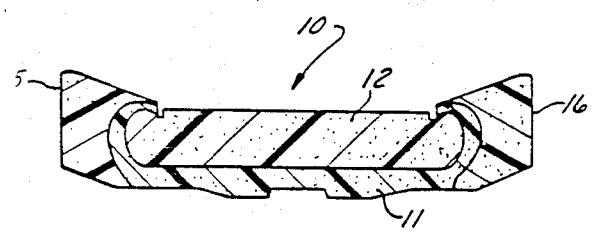
FIG. 3 is a side elevational view of one embodiment of the invention taken along lines 3—3 in FIG. 2.
Figure 4:
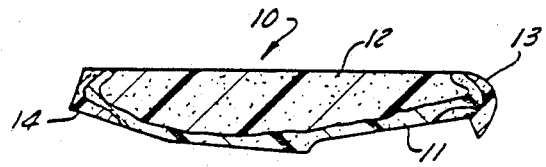
FIG. 4 is a view in section taken along the line 4—4 in FIG. 2.

The cushion 10 as seen best in FIGS. 3 and 4 is comprised of a firm foam bottom layer 11, a soft foam top layer 12 which is partially encapsulated on the sides by layer 11, a front foam cap 13, a back foam cap 14 and side 15 and 16 which also are of foam. All the foams are bonded or knitted together during the molding process, thus making the use of adhesives or glues unnecessary.

The function of the layer 11 is to provide the cushion with a firm supportive bottom. The layer 12 provides a soft, comfortable load distributor which gives the overall cushion a soft and luxurious feel. The front cap 13 is of a firm and tough foam; it protects the front of the less durable soft layer and provides support for the front of the cushion. The back cap 14 is firm and provides additional support and strength at the back of the cushion, in addition, to protecting the back of the soft layer. The sides 15 and 16 can be of the same or different firmness depending upon the level of support desired in those areas of the cushion. For example, if the cushion is used as a vehicle seat the side closest to the door should be of a tougher and more durable foam than the other side to withstand wear caused by entry and exit from the vehicle.

The method of preparing the embodiment of the composite foam seat cushion 10 of FIGS. 3 and 4 will now be described in connection with FIGS. 2 and 7 to 12 of the drawings.

Figure 7:
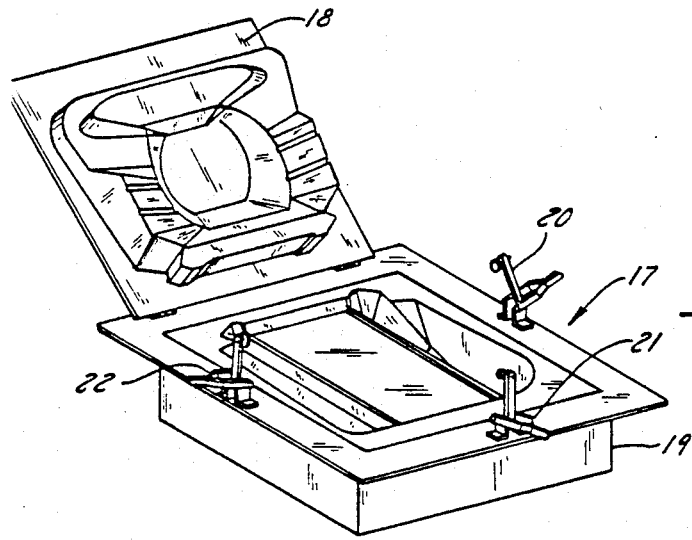
FIG. 7 is a perspective view of an open mold in which the composite foam seat cushion may be produced.
Figure 8:
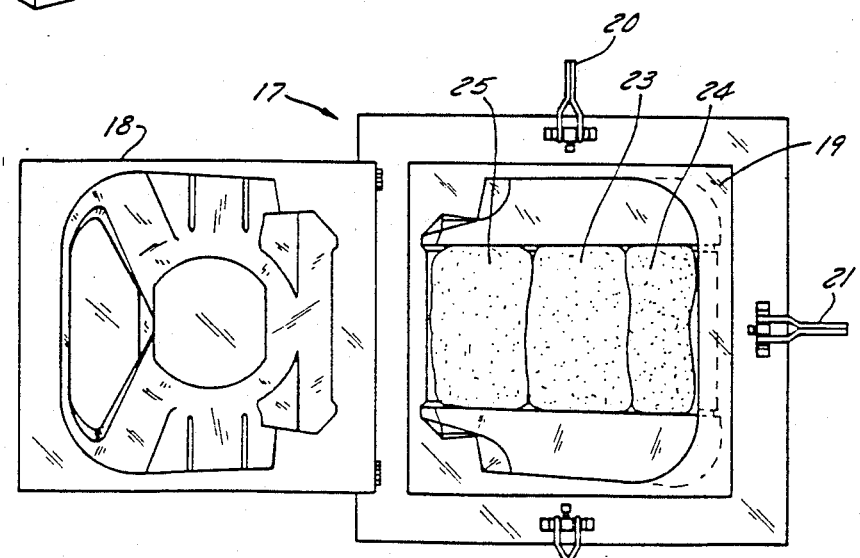
FIG. 8 is a plan view of the mold of FIG. 7 with the first formulation therein.

The composite foam cushion 10 is prepared in a mold 17 such as that seen in FIGS. 7 and 8. The mold 17 which is of metal, such as diecast aluminum, includes a lid 18 and a container 19. Toggle clamps 20, 21 and 22 are provided for securing the lid 18 to the container 19. The interior of container 19 is coated with a suitable release agent e.g. silicone. The mold 17 is preferably placed on a conveyor line (not shown) and liquid formulations for the foams poured into the mold which is heated to about 100° to about 120° F.

Figure 9:
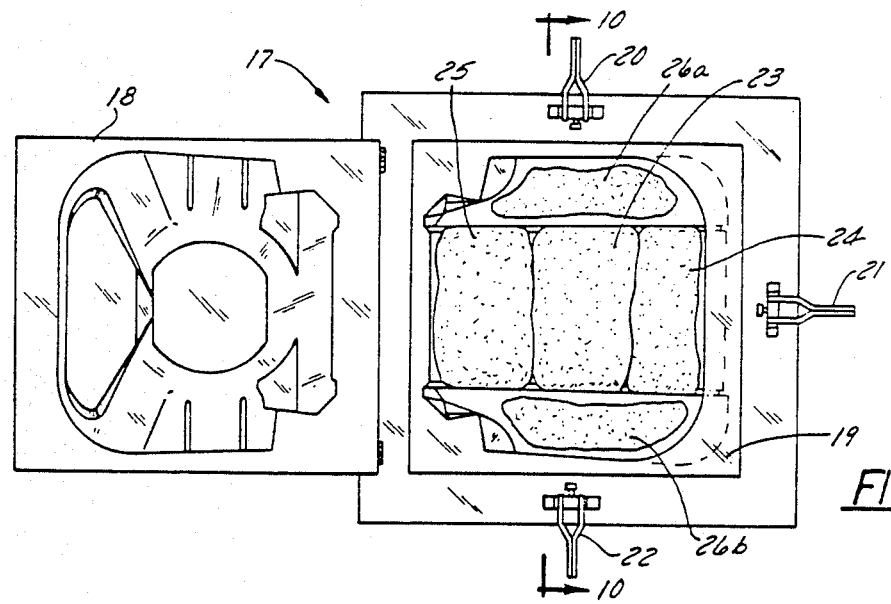
FIG. 9 is a view similar to FIG. 8 with additional formulations therein.
Figure 10:
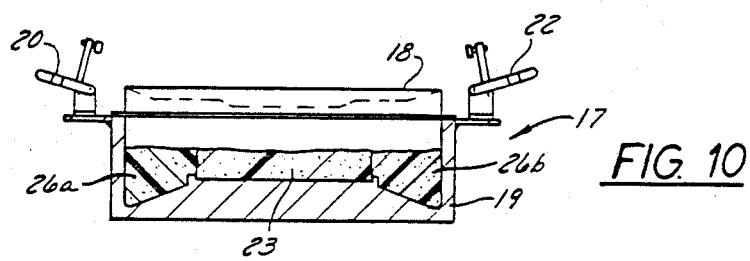
FIG. 10 is a side elevational view in section and taken along line 10—10 in FIG. 9 showing the formulations after they have creamed and commenced to rise.
Figure 11:
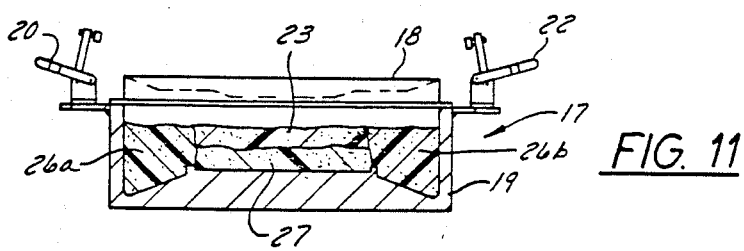
FIG. 11 is a view similar to FIG. 10 showing the mold after the soft foam formulation has been added.
Figure 12:
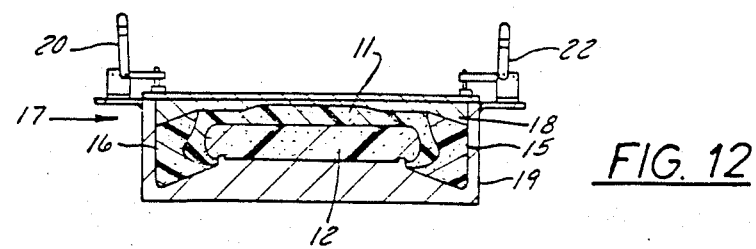
FIG. 12 is a view similar to FIG. 10, but with the lid of the mold closed and the foams completely filling the mold.

In a preferred practice of the method of the present invention, a first liquid formulation 23 which will form the bottom layer 11 is poured into the mold 17 covering Sections DGD (refer to FIG. 2) of the mold. Immediately, before the first formulation 23 creams or rises, a second formulation 24 which will form the front cap 13 is poured into Sections EHE and a third formulation 25 which will form the back cap 14 is poured into Sections CFC of the mold (FIG. 8). Before any of the already poured formulations can rise or cream substantially, formulations 26a and 26b, which can be the same or different, are poured into the side or wing portions A and B of the mold, respectively. The entire bottom of the mold is now covered with foam formulations (FIG. 9). After a suitable time delay of about 35 to about 55 seconds the poured formulations cream and rise to about 10% to about 60% of their potential rise (FIG. 10) and the portions of the formulations which produce the front and back caps 13 and 14 and which are in contact with the heated mold have gelled and the resulting form has solidified and has structural integrity. A liquid formulation 27 which will form the soft foam layer 12 is then poured into the mold 17 through the centers of the first formulation 23 in Sections DGD and the formulations 24 and 25 in Sections EHE and CFC, respectively. The creaming and rising formulation 23 which is now of lower density is displaced by and floats on formulation 27 (FIG. 11). In addition the portions of the formulations 24 and 25 that are still creaming, rising and lack structural integrity also float. However, the portions of formulations 24 and 25 which are in contact with the heated mold and which have gelled and solidified do not float; thus the front and back caps are formed. If it is desired to encapsulate the soft foam layer 12, the firm foam formed by formulation 23, the formulation 27 is not poured until the portion of formulation 23 in contact with the heated mold has gelled and the resulting foam has solidified and possesses structural integrity. The mold 17 is then closed with the lid 18 and sealed with the toggle bolts 20, 21 and 22, and the contents permitted to rise to fill the mold 17 (FIG. 12).

The foaming material in the mold is allowed to cure sufficiently so that it will retain the desired form. The time required ranges from between about 6 to about 10 minutes and varies with the ingredients of the formulations and the amount and type of catalyst utilized. The resulting composite foam cushion 10 is then removed from the mold 17 and, if desired, crushed through squeeze rollers to mechanically open closed cells and allowed to further cure. When used as a cushion, it is inverted 180° so that the firm supportive layer 11 is at the bottom and the soft layer 12 is at the top as seen in FIGS. 1 to 4.

In the preferred practice of the invention, the formulations which will eventually form the firmer supportive areas of the cushion are added first. These formulations have the slowest reaction time of the formulations employed which usually is a result of their having less catalyst proportionately than the later used formulations. The foam formulation with the next lowest proportional concentration of catalyst and next slowest reaction time is added next, and so on.

Figure 5:
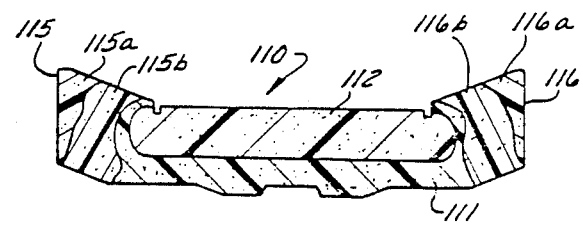
FIG. 5 is a view similar to FIG. 3 of another embodiment of the invention.
Figure 6:
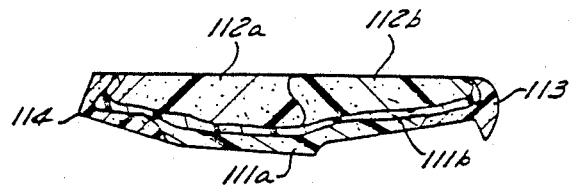
FIG. 6 is a view similar to FIG. 4 of the embodiment of FIG. 5.

The embodiment of the cushion 110 seen in FIGS. 5 and 6 differs from that of the embodiment of FIGS. 1 to 4 in that the bottom 111 is comprised of two firm foams 111a and 111b of different firmness, the soft layer 112 is comprised of two soft foams of different firmness 112a and 112b and the sides 115 and 116 also are each comprised of two foams of different firmness i.e. foams 115a, 115b and 116a and 116b, respectively. If desired, either or all of the bottom, soft layer, caps and sides may be formed of one, two or more foams of different firmness.

The following examples will further illustrate the advantages of the present invention, and provide a more complete understanding of the preferred process.

EXAMPLES AND MATERIALS

The mold employed was similar in shape to that shown in FIGS. 7 to 12. It measured approximately 17"×19"×5" and was equipped with a lid and toggle bolts to hold the lid in place. The mold 17 was of die cast aluminum and heated to about 100° to about 120° F.

In the Examples the following formulations were used.

|  | Grams |
|---|---|
| Formulation No. 1     100 Index | |
| Polyether triol, 4800 M.W. hydroxyl number 34.0 (NIAX Polyol 11-34) | 63.20 |
| Acrylonitrile Polymer Polyol hydroxyl number 28.0 (NIAX Polyol 31-28) | 35.00 |
| Diethanolamine | 1.80 |
| Water | 2.30 |
| Tertiary amine catalyst | 1.90 |
| Non-hydrolyzable silicone surfactant (L5309) | 0.60 |
| Fluorocarbon blowing agent | 8.00 |
| Quasi Prepolymer 32% free NCO (NIAX isocyanate SF 50) | 41.70 |
| Formulation No. 2     105 Index | |
| Polyether triol, 4800 M.W. hydroxyl number 34.0 (NIAX Polyol 11-34) | 60.19 |
| Acrylonitrile Polymer Polyol hydroxyl number 28.0 (NIAX Polyol 31-28) | 33.33 |
| Diethanolamine | 1.71 |
| Water | 2.19 |
| Tertiary amine catalyst | 1.80 |
| Non-hydrolyzable silicone surfactant (L5309) | 0.57 |
| Fluorocarbon blowing agent | 7.61 |
| Quasi Prepolymer 32% free NCO (NIAX isocyanate SF 50) | 41.70 |
| Formulation No. 3     95 Index | |
| Polyether triol, 4800 M.W. hydroxyl number 34.0 (NIAX Polyol 11-34) | 66.52 |
| Acrylonitrile Polymer Polyol hydroxyl number 28.0 (NIAX Polyol 31-28) | 36.85 |
| Diethanolamine | 1.89 |
| Water | 2.42 |
| Tertiary amine catalyst | 2.00 |
| Non-hydrolyzable silicone surfactant (L5309) | 0.63 |
| Fluorocarbon blowing agent | 8.42 |
| Quasi Prepolymer 32% free NCO (NIAX isocyanate SF 50) | 41.70 |
| Formulation No. 4     90 Index | |
| Polyether triol, 4800 M.W. hydroxyl number 34.0 (NIAX Polyol 11-34) | 70.22 |
| Acrylonitrile Polymer Polyol hydroxyl number 28.0 (NIAX Polyol 31-28) | 38.88 |
| Diethanolamine | 2.00 |
| Water | 2.55 |
| Tertiary amine catalyst | 2.11 |
| Non-hydrolyzable silicone surfactant (L5309) | 0.66 |
| Fluorocarbon blowing agent | 8.88 |
| Quasi Prepolymer 32% free NCO (NIAX isocyanate SF 50) | 41.70 |
| Formulation No. 5     80 Index | |
| Polyether triol, 4800 M.W. hydroxyl number 34.0 (NIAX Polyol 11-34) | 79.00 |
| Acrylonitrile Polymer Polyol hydroxyl number 28.0 (NIAX Polyol 31-28) | 43.75 |
| Diethanolamine | 2.25 |
| Water | 2.88 |
| Tertiary amine catalyst | 2.38 |
| Non-hydrolyzable silicone surfactant (L5309) | 0.75 |
| Fluorocarbon blowing agent | 10.00 |
| Quasi Prepolymer 32% free NCO (NIAX isocyanate SF 50) | 41.70 |
| Formulation No. 6     80 Index | |
| Polyether triol, 4800 M.W. hydroxyl number 34.0 (NIAX Polyol 11-34) | 75.00 |
| Acrylonitrile Polymer Polyol hydroxyl number 28.0 (NIAX Polyol 31-28) | 43.75 |
| Ethoxylated triethanolamine hydroxyl number 635 (Thanol SF 265) | 6.25 |
| Water | 3.13 |
| Tertiary amine catalyst | 1.69 |
| Organo-tin catalyst | 0.04 |
| Non-hydrolyzable silicone surfactant (L5309) | 1.25 |
| Fluorocarbon blowing agent | 10.00 |
| Modified poly isocyanate 40% free NCO (Mondur MT 40) | 40.76 |
| Formulation No. 7     85 Index | |
| Polyether triol, 4800 M.W. hydroxyl number 34.0 (NIAX Polyol 11-34) | 70.58 |
| Acrylonitrile Polymer Polyol hydroxyl number 28.0 (NIAX Polyol 31-28) | 41.17 |
| Ethoxylated triethanolamine hydroxyl number 635 (Thanol SF 265) | 5.88 |
| Water | 2.94 |
| Tertiary amine catalyst | 1.58 |
| Organo-tin catalyst | 0.035 |
| Non-hydrolyzable silicone surfactant (L5309) | 1.18 |
| Fluorocarbon blowing agent | 9.41 |
| Modified poly isocyanate 40% free NCO (Mondur MT 40) | 40.76 |
| Formulation No. 8     100 Index | |
| Polyether triol, 4800 M.W. hydroxyl number 34.0 (NIAX Polyol 11-34) | 60.00 |
| Acrylonitrile Polymer Polyol hydroxyl number 28.0 (NIAX Polyol 31-28) | 35.00 |
| Ethoxylated triethanolamine hydroxyl number 635 (Thanol SF 265) | 5.00 |
| Water | 2.50 |
| Tertiary amine catalyst | 1.35 |
| Organo-tin catalyst | 0.03 |
| Non-hydrolyzable silicone surfactant (L5309) | 1.00 |
| Modified poly isocyanate 40% free NCO (Mondur MT 40) | 40.76 |

Reference Load Indentation Deflections

| | | | | |
|---|---|---|---|---|
| Formulation No. 1 | 25% | 67.3 | 4" × 15" × 15" Block | 1037 gms |
| | 65% | 200.5 | | |
| | Sag | 2.98 | | |
| Formulation No. 2 | 25% | 73.2 | 4" × 15" × 15" Block | 1003 gms |
| | 65% | 213.7 | | |
| | Sag | 2.92 | | |
| Formulation No. 3 | 25% | 59.0 | 4" × 15" × 15" Block | 1087 gms |
| | 65% | 179.0 | | |
| | Sag | 3.01 | | |
| Formulation No. 4 | 25% | 49.2 | 4" × 15" × 15" Block | 1111 gms |
| | 65% | 145.2 | | |
| | Sag | 2.95 | | |
| Formulation No. 5 | 25% | 35.6 | 4" × 15" × 15" Block | 1216 gms |
| | 65% | 104.6 | | |
| | Sag | 2.94 | | |
| Formulation No. 6 | 25% | 14.4 | 4" × 15" × 15" Block | 1283 gms |
| | 65% | 44.9 | | |
| | Sag | 3.11 | | |
| Formulation No. 7 | 25% | 16.3 | 4" × 15" × 15" Block | 1223 gms |
| | 65% | 48.5 | | |
| | Sag | 2.98 | | |
| Formulation No. 8 | 25% | 30.1 | 4" × 15" × 15" Block | 1026 gms |
| | 65% | 87.4 | | |
| | Sag | 2.90 | | |

The ingredients of Formulations No. 1 to 8 having the brand name NIAX and the silicone surfactant are available from Union Carbide. The ethoxylated triethanol amine (Thanol SF 265) is available from the Jefferson Chemical Company and the modified polyisocyanate (Mondur) is available from Mobay Chemical. The products of other manufacturers having equivalent properties and serving the same functions can be substituted.

EXAMPLE 1

Formulation No. 3 (205 grams) was poured into Section A and an equal amount was poured into Section B. Then 123 grams of Formulation No. 4 was poured into the front Sections EHE of the mold and 133 grams of Formulation No. 2 were poured into Sections DGD. Next, 123 grams of Formulation No. 4 was poured into the Sections CFC. After a time delay of 30 to 55 seconds during which Formulation No. 4 started to gel, 411 grams of Formulation No. 6 was poured through the rising Formulation No. 2 in Sections DGD. The material was then allowed to fully expand and cure in the mold. The finished cushion after 24 hours of curing had an ILD of 25%, 22.3, 65%, 116.7 and a sag factor of 5.23.

EXAMPLE 2

Formulation No. 4 (210 grams) was poured into Section A and another 210 grams was poured into Section B. Formulation No. 3 was poured into Sections CFC (120 grams) and Formulation No. 2 was poured into Sections DGD (133 grams). Formulation No. 3 (120 grams) was then poured into Sections EHE. After a time delay of 35 to 55 seconds during which Formulation No. 3 started to gel, Formulation No. 7 (398 grams) was poured into the rising foam in Sections DGD. The material was then allowed to fully expand and cure. After 24 hours the cushion had ILD values of 25% 28.3, 65% 121.4, and sag factor 4.28.

EXAMPLE 3

The procedure in Example 2 was repeated except that a soft foam Formulation No. 7 (398 grams) was poured into the centers of Sections F, G and H through the rising Formulations Nos. 3 and 2. The finished cushion after 24 hours had ILD values of 25% 26.3, 65% 118.4 and a sag factor of 4.50.

EXAMPLE 4

The procedure of Example 2 was repeated except that Formulation No. 2 was poured into both Sections DGD and EHE and that Formulation No. 7 was poured through the rising Formulations Nos. 2 and 3 into the centers of Sections F, G and H. The ILD values of the finished cushion were 25% 25.1, 65% 124.3, and sag factor 4.95.

EXAMPLE 5

Formulation No. 4 was poured into Section A (210 grams) and Section B (210 grams). Formulation No. 3 was poured into Sections CFC (120 grams) and Formulation No. 2 was poured into Sections DGD (133 grams). Formulation No. 1 was then poured into Sections EHE (125 grams). After a time delay of 35 to 55 seconds during which Formulations Nos. 1 and 3 started to gel, Formulation No. 6 (411 grams) was poured into the center of Section D through Formulation No. 2. The lid was then closed and the cushion was allowed to expand. The ILD values after 24 hours of curing were 25% 21.4, 65% 109.5, and sag factor 5.11.

EXAMPLE 6

Formulation No. 3 (210 grams) was poured into Section A and a similar amount was poured into Section B. Next 120 grams of Formulation No. 4 was poured into the front Section CFC and 133 grams of Formulation No. 2 was poured into middle Sections DGD. Formulation No. 1 (125 grams) was poured into the back Section EHE. After a time delay of 35 to 55 seconds during which Formulations Nos. 1, 2 and 4 started to gel, Formulation No. 6 (411 grams) was poured through the centers of all the rising foam formulations. The material was allowed to fully expand and cure. After 24 hours Sections EHE had ILD values of 25% 20.1, 65% 85.5 and sag factor 4.25. Section DGD had ILD values of 25% 20.6, 65% 108.4 and sag factor 5.31 and Section CFC had values of 25% 23.2, 65% 112.4 and sag factor 4.84.

EXAMPLE 7

The procedure of Example 6 was followed except that 120 grams of foam Formulation No. 4 was poured in Sections CFC, 133 grams of Formulation No. 1 was poured into Sections DGD and 125 grams of Formulation No. 2 was poured into Sections CFC. The front (Sections EHE) of the finished cushion had ILD values of 25% 22.1, 65% 77.4, and sag factor 3.50. The middle (Sections DGD) had ILD values of 25% 28.0, 65% 125.0, and a sag factor of 4.47. The rear (Sections EHE) had ILD values of 25% 19.0, 65% 95.7 and sag factor 5.03.

EXAMPLE 8

The procedure of Example 6 was followed except 125 grams of Formulation No. 1 was poured into Sections EHE, 133 grams of Formulation No. 3 was poured into Sections DGD, and 120 grams of Formulation No. 2 was poured into Sections CFC. The finished cushon had the following ILD values front 25% 20.9, 65% 96.9, sag 4.63; middle 25% 23.5, 65% 110.7, sag 4.71. Section CFC 25% 22.2, 65% 96.6, and sag 4.35.

EXAMPLE 9

The procedure of Example 6 was followed except that 120 grams of Formulation No. 2 was poured into Sections EHE, 133 grams of Formulation No. 4 was poured into Sections DGD and 120 grams of Formulation No. 1 was poured into Sections CFC.

The finished cushion had the following properties: front 25% 16.9, 65% 101.1, sag 5.98; middle 25% 20.3, 65% 97.5, sag 4.80 and rear 25% 16.9, 65% 83.1, and sag 4.91.

In the cushions formed in Examples 6 through 9, the soft foam layer 12 was completely encapsulated in firmer formulations.

EXAMPLE 10

Formulation No. 3 (210 grams) was poured into Section A and a similar amount was poured into Section B. Formulation No. 4 (120 grams) was poured into Sections EHE and Formulation No. 2 (133 grams) was poured into Sections DGD and Formulation No. 1 (125 grams) was poured into Sections CFC. After a time delay of 35 to 55 seconds, two soft foam formulations were poured through the rising foam mass. Formulation No. 6 (210 grams) was poured into one-half of section G and the center of Section H and Formulation No. 7 (200 grams) was poured into the other half of Section G and the center of Section F. The material was then allowed to expand and cure and properties of the cushion were evaluated. The front had ILD values of 25% 13.4, 65% 43.3, and sag factor 3.23. The middle had ILD values of 25% 22.8, 65% 124.2 and sag 5.44. The rear had ILD values of 25% 22.3, 65% 140.3, and sag factor 6.29.

The cushion prepared in this example differed from all those previously prepared in that it had a soft foam layer which was comprised of foams of two different firmnesses. The portion of the soft foam towards the front of the seat was softer than that towards the back of the seat where more support was desired.

EXAMPLE 11

Formulation No. 3 (175 grams) was poured into Section A and a similar amount was poured into Section B.

Into Sections EHE was poured 120 grams of Formulation No. 4; 133 grams of Formulation No. 2 were poured into Sections DGD and 125 grams of Formulation No. 1 were poured into Sections EHE. After a time delay of 35 to 55 seconds, Formulation No. 6 (50 grams) was poured through the rising foam in Section A. In addition, Formulation No. 6 (210 grams) was poured through the rising foam in the center of Sections EHE and one-half of Sections DGD. Formulation No. 7 (200 grams) was then poured through the rising foam in the other half of Sections DGD and the center of sections CFC. Finally Formulation No. 6 (50 grams) was poured through the rising foam in Section B. The resulting cushion had general overall ILD values of 25% 25.0, 65% 125.0, and sag factor 5.0. The cushion thus obtained had sides or wings (Sections A and B) which were comprised of an exterior softer foam, a supportive firmer middle foam and a still firmer bottom foam. The cushion also had a front of different firmness than the back and a soft middle and top section which was comprised of foams of two different softnesses.

EXAMPLE 12

Formulation No. 3 (210 grams) was poured into Section A and Formulation No. 5 (235 grams) was poured into Section B. Formulation No. 4 (120 grams) was poured into Sections EHE and Formulation No. 2 (133 grams) was poured into Sections DGD and 125 grams of Formulation No. 1 was poured into Sections CFC. After a time delay of 35 to 55 seconds Formulation No. 6 was poured through the centers of all the rising foam formulations except in Sections A and B. The mold was closed and the material was allowed to expand and cure. After 24 hours the cushion had ILD values of 25% 20.1, 65% 108.4, and sag factor 5.39. The resulting cushion had one side or wing which was of firmer density than the other, a generally soft central section of two different foams and a front and back of different foam densities which were both firmer than the foam of the central cushion (Sections DGD).

The articles prepared in the examples were judged by the appearance of the article and its appropriateness for use as a cushion, the appearance of a cross section of the article and the sag factor. A cross section of the article indicated that there was a clear stratification of the foams of different firmness and a strong knitting line where the foams were joined.

The method of determining the load indentation deflection values was that described in ASTM D 1564-63T. The sag factor or I.L.D. (65/25) index is the ratio of a 65% load value divided by the 25% value. This ratio indicates to some extent a more or less linear relationship between ratings taken to form a resilience curve. A sag factor of 3 to 4.5 pounds is considered acceptable for a seat cushion for a snowmobile or piece of industrial equipment and a sag factor of about 4.5 to about 6.0 is considered acceptable for a passenger vehicle seat or upholstered furniture.

Although for purposes of illustration specific formulations have been described, it will be readily understood by those skilled in the art that any foam formulations which yield foams having the desired properties when used in the method of the invention can be employed. The selection of ingredients will depend upon the function the foam layer is desired to perform. When the function of the firm foam layer is to provide high support, a high ILD foam is preferred. However, if the primary function of the firm foam layer is to provide an energy absorbing layer, the formulation should be designed to yield a semi-flexible foam with a high degree of cross linking. Intermediate firmness foams can be used where they provide sufficient support for the intended use. The soft foam layer is preferably a high resiliency low ILD foam. However, any soft foam formulation which results in a soft foam layer which functions as a comfortable load distributor and gives the overall cushion a soft and luxurious feel can be employed.

Polyurethane foams are formed by the reaction of a polyol and a polyisocyanate in the presence of a blowing agent, a catalyst, water and surfactant. The blowing agent, water, and isocyanate reaction produce gases for foaming, the catalyst speeds the reaction and the surfactant stabilizes the rising foam and controls cell size. By varying the type and amount of these ingredients, urethane foams can be made by those skilled in the art to meet the requirements of the firm, supportive layer and soft, comfortable layer.

It will be apparent to those skilled in the art that a number of modifications may be made without departing from the spirit and scope of the invention. It is, therefore, to be understood that the scope of the present invention is not to be limited except by the claims which follow:

I claim:

1. A method of preparing a composite foam seat cushion having at least a bottom of firm supportive foam, a layer of soft foam on top of the bottom, a protective foam cap covering a back edge of the soft foam layer, and supportive foam sides, said method comprising:
   placing in the center of a suitable mold a relatively slow reacting formulation which will produce a firm supportive foam bottom of a cushion;
   placing in the front of the mold a formulation which will produce a foam of suitable properties to serve as a protective cap for the front edge of the soft layer;
   placing in the back of the mold a formulation which will produce a suitable back cap;
   placing in opposite sides of the mold formulations which will produce sides of desired properties;
   allowing all of the above-recited formulations to foam and start to rise;
   allowing such portions of the formulations in the front and rear of the mold as are in contact with the mold surface to start to gel; and thereafter,
   pouring through at least one of the above-recited formulations a formulation which will produce the soft layer.

2. The method of claim 1 in which the formulations are polyurethane foam formulations.

3. A composite foam seat cushion made by the method of claim 1.

4. A method of forming a composite foam seat cushion having a bottom of at least one layer of a firm supportive foam, a layer of a soft foam disposed on top of the bottom and at least partially enclosed thereby, protective foam caps covering front and rear edges of the soft foam layer and having firmnesses that are different from the firmness of the soft layer, and supportive foam sides each made of at least two foams forming inner and laterally outermost portions of each of the supportive foam sides, said method comprising the steps of:
   providing a suitable heated mold having a central portion and side portions disposed on opposite sides of the central portion;

introducing, into each of the side portions of the mold, formulations which will produce foams having desired firmnesses for the outermost portions of the supportive sides of the cushion;

introducing, into a front portion of the central portion of the mold, a formulation which will produce a foam of suitable properties to serve as the protective cap for the front edge of the soft layer;

introducing, into a rear portion of the central portion of the mold, a formulation which will produce a foam of suitable properties to serve as the protective cap for the rear edge of the soft layer;

introducing into the central portion of the mold, at a location thereof that is between the front and rear portions thereof, a formulation which will produce the firm foam bottom of the cushion;

allowing all of the formulations to foam and to begin to rise;

allowing such portions of the formulations as are in contact with the side portions of the mold and in contact with the front and rear portions of the central portion of the mold to begin to gel;

thereafter introducing, into each of said side portions of said mold, formulations which will produce foams having desired firmnesses for the inner portions of the cushion sides, thereby displacing portions of the formulations that are to form the outermost portions of the cushion sides; and introducing, into said central portion of the mold, formulation which will produce foam having the desired firmness for the soft cushion layer, thereby causing portions of the formulation that is to form the firm bottom to form around lateral sides of the formulation for the soft layer, thereby further causing the formulations that are to form the protective front and rear caps to form around front and rear edges of the formulation for the soft layer.

5. The method of claim 4 in which the formulations are polyurethane foam formulations.

6. A composite foam seat cushion made by the method of claim 4.

7. The method of claim 4, wherein said step of introducing formulation to produce the soft layer comprises the step of introducing into the front half of the central portion of the mold a first formulation for producing a first soft foam of a first firmness in a front part of the soft foam layer and introducing into the rear half of the central portion of the mold a second formulation for producing a second soft foam of a second firmness that is different from said first firmness, thereby producing a cushion having a soft foam layer that is composed of foams of differing firmnesses.

8. The method of claim 7 in which the formulations are polyurethane foam formulations.

9. A composite foam seat cushion made by the method of claim 7.

10. The method of claim 4, wherein said step of allowing portions of the formulations to begin to gel further comprises the step of allowing the portions of the formulations that are in contact with the entire central portion of the mold to begin to gel, thereby forming an uppermost cushion layer of firm foam that will encapsulate the formulation for the soft layer when the latter is introduced.

11. The method of claim 10 in which the formulations are polyurethane foam formulations.

12. A composite foam seat cushion made by the method of claim 10.

* * * * *